3,285,809
PROCESS OF CONTROLLING MICROBIAL ACTIVITY

Robert R. Mod, Evald L. Skau, Sara P. Fore, and Frank C. Magne, New Orleans, Arthur F. Novak, Baton Rouge, and Harold P. Dupuy, Jesse R. Ortego, and Mary J. Fisher, New Orleans, La., assignors to the United States of America as represented by the Secretary of Agriculture
No Drawing. Continuation of application Ser. No. 197,545, May 24, 1962. This application June 8, 1965, Ser. No. 462,455
7 Claims. (Cl. 167—22)

This application is a continuation of Serial No. 197,545, filed May 24, 1962, now U.S. Patent 3,250,794.

A non-exclusive, irrevocable, royalty-free license in the invention hereindescribed, throughout the world for all purposes of the United States Government, with the power to grant sublicenses for such purposes, is hereby granted to the Government of the United States of America.

This invention relates to certain new nitrogen containing organic compounds. More particularly, this invention relates to derivatives of aliphatic acid amides which exhibit anti-microbial activity. The substituted amides that are the subject of this invention are characterized by the fact that as growth inhibitors, they are effective against a variety of micro-organisms that include bacteria, yeasts, and molds, many of which are pathogenic.

The findings herein disclosed are considered remarkable in that in some notable instances compounds that are closely related from the point of view of chemical architecture exhibit quite opposite effects against the same organisms. For example, one compound may exhibit properties as a growth inhibitor against one particular organism while a closely related counterpart may serve to promote increased growth for the same organism. Some of these amides exhibit broad antimicrobial spectrum, whereas others exhibit selective antimicrobial spectrum.

The compounds which are the subject of this invention are:

4-(6-hydroxycaproyl)morpholine

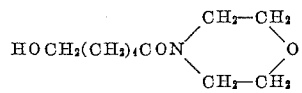

4-decanoyl-2,6-dimethylmorpholine

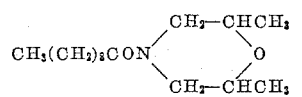

N-butyldecanamide

N-isoamyldecanamide $CH_3(CH_2)_8CONHCH_2CH_2CH(CH_3)_2$

N-cyclohexyldecanamide

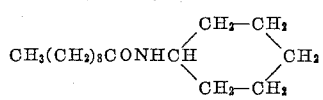

N,N-bis(2-decanoyloxyethyl)decanamide $CH_3(CH_2)_8CON[CH_2CH_2OOC(CH_2)_8CH_3]_2$ N-decanoylhexamethylenimine

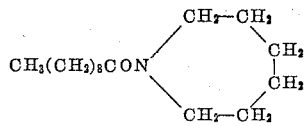

N-decanoyl-N'-methylpiperazine

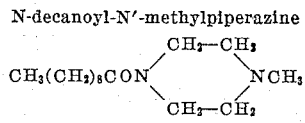

N,N'-didecanoylpiperazine

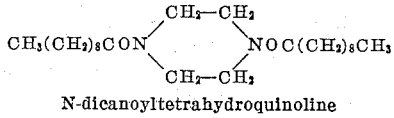

N-dicanoyltetrahydroquinoline

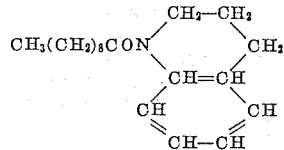

N,N-bis(2-hydroxyethyl)lauramide $CH_3(CH_2)_{10}CON[CH_2CH_2OH]_2$

N,N-bis(2-decanoyloxyethyl)lauramide $CH_3(CH_2)_{10}CON[CH_2CH_2OOC(CH_2)_8CH_3]_2$ N,N-bis(2-lauroyloxyethyl)lauramide $CH_3(CH_2)_{10}CON[CH_2CH_2OOC(CH_2)_{10}CH_3]_2$ 4-(6(7)-hydroxystearoyl)morpholine

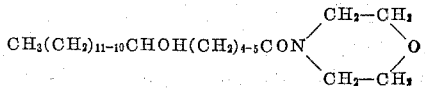

4-oleoyl-2,6-dimethylmorpholine

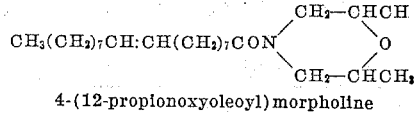

4-(12-propionoxyoleoyl)morpholine

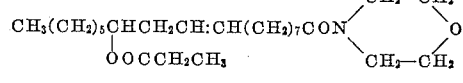

N-tert-butyloleamide $CH_3(CH_2)_7CH:CH(CH_2)_7CONHC(CH_3)_3$

N-oleoylhexamethylenimine

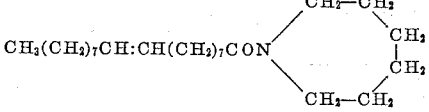

N-oleoyl-N'-methylpiperazine

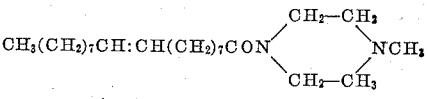

4-petroselinoylmorpholine

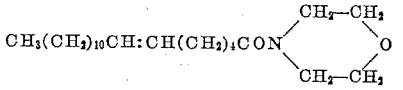

MORPHOLIDES OF PARSLEY SEED OIL FATTY ACIDS

The new nitrogen-containing compounds which are the subject of this invention were prepared by conventional methods.

The bioactivity of these various new nitrogen-containing compounds has been established by us in vitro but, as will be apparent to those skilled in the arts pertaining to the growth inhibition of bacteria, yeast, and molds, the compounds, besides being used as such, will for utilitarian purposes commonly be formulated using a diluent that can be either liquid, viscous, or solid.

A wide variety of extending agents is operable, the only significant requirement being that the diluent or extender be inert with respect to the amide involved. Petroleum jellies, various alcohols and polyols, vegetable oils and the like are suitable.

In the case of intended use as fungicide in the protective coating composition art, the compounds that are the subject of this invention are compatible with conventional and with drying oil modified alkyds, for example.

Specific examples showing the preparation of each of the new compounds being claimed are set forth below along with appropriate data in tabular form which is being submitted for the purpose of establishing the growth inhibiting properties of the claimed compounds.

EXPERIMENTAL

Difco Bacto Dehydrated Stock Culture Agar at pH 7.0, Difco Bacto Dehydrated Yeast Morphology Agar at pH 4.5, and Difco Dehydrated Mycological Agar at pH 7.0 were selected to test the inhibition of the bacteria, yeast, and mold cultures, respectively.

Fatty acid derivatives were screened for their antimicrobial activity against two bacteria—a gram positive, *Micrococcus pyogenes*, and a gram negative, *Escherichia coli;* several yeasts—*Saccharomyces cerevisiae, Candida stellatoidea,* and Torulopsis sp.; and several molds—Neurospora sp., Alternaria sp., Mucor sp., Hormodendrum sp., Geotrichum sp., Penicillium sp., and Aspergillus sp., as illustrated in Table I. Fatty acid derivatives were screened for their antimicrobial activity against two bacteria—a gram negative, *Escherichia coli,* and a gram positive, *Micrococcus pyogenes;* and many pathogenic molds—*Candida albicans, Candida wernecki, Epidermophyton floccosum, Keratinomyces ajelloi, Microsporum canis, Microsporum cookii, Microsporum gypseum, Microsporum Nanum, Trichophyton concentricum, Trichophyton epilans, Trichophyton equinum, Trichophyton ferrugineum, Trichophyton gallinae, Trichophyton megnini, Trichophyton mentagrophytes* var. *interdigitales, Trichophyton mentagrophytes* var. *granulare, Trichophyton rubrum, Trichophyton Sabouraudi, Trichophyton schoenleini, Trichophyton sulfurium, Trichophyton tonsurans,* and *Trichophyton violaceum,* as illustrated in Tables IIA and IIB.

Seeded agar plates were used to measure the antimicrobial activity against bacteria and yeasts. The filter paper disc method was used to evaluate the liquid compounds, and the cylinder plate method was used to evaluate the solid compounds. Standard-size paper discs or uniform-size stainless steel cylinders were placed on the surface of the previously inoculated plates. The liquid compounds were pipetted onto the discs, and the solid compounds were introduced into the stainless steel cylinders.

Streaked and poured agar plates were used to measure the antimycotic activity against molds. The streaked agar plates were prepared by streaking the hardened agar plates with the test mold, and the poured agar plates were prepared by pouring dillutions of mold spores over the hardened agar plates. The compounds were then added onto specified areas of these streaked and poured agar plates. The paper disc method was used to evaluate the liquid and solid compounds, the solid compounds were simply dissolved in glycerol or ethanol before applying onto the paper disc. The solid compounds were also tested in pure form by introducing the solid material directly on the surface of the inoculated agar plates.

To eliminate any error which could result from an insufficient number of tests, a minimum of three experiments employing duplicate plates was used for measuring the antimicrobial activity of each compound.

All test plates were incubated at the optimum growing temperature for each organism. The tabulated results illustrated in Table I were obtained from periodic readings after 1, 2, 3, and 5 days, respectively. The tabulated results illustrated in Tables IIA and IIB were obtained from periodic readings after 3, 5, and 7 days, respectively. Zones of inhibition were compared with those of the controls.

TABLE I.—THE ANTIMICROBIAL ACTIVITY OF SOME RICINOLEIC AND OLEIC ACID DERIVATIVES

| Compound[a] | Antimicrobial activity[b] Micro-organisms[c] | | | | | | | | | | | |
|---|---|---|---|---|---|---|---|---|---|---|---|---|
| | A | B | C | D | E | F | G | H | I | J | K | L |
| Ricinoleic acid | ++ | − | − | − | − | + | ++ | o | + | + | ++ | ++ |
| Ricinelaidic acid | + | − | − | − | − | + | − | − | o | − | o | − |
| 12-hydroxystearic acid | − | − | − | − | − | − | − | − | − | − | o | − |
| 4-ricinoleoylmorpholine | ++ | + | − | − | o | ++ | ++ | − | ++ | + | oo | ++ |
| 4-ricinelaidoylmorpholine | + | + | − | − | − | ++ | ++ | − | + | + | o | ++ |
| 4-(12-hydroxystearoyl)morpholine | + | + | + | − | − | + | − | − | − | − | − | ++ |
| Methyl ricinoleate | − | − | − | − | − | − | − | o | − | − | − | ++ |
| Methyl ricinelaidate | + | + | + | − | o | + | − | − | − | − | − | o |
| Methyl 12-hydroxystearate | ++ | − | ++ | − | + | + | o | − | o | + | o | − |
| 4-(12-β-cyanoethoxy-oleoyl)morpholine | + | + | − | − | o | + | − | ++ | o | + | + | o |
| 4-(12-β-cyanoethoxyelaidoyl)morpholine | + | − | − | − | − | − | − | + | − | − | − | + |
| 4-(12-β-cyanoethoxystearoyl)morpholine | + | − | − | − | + | − | − | o | − | − | − | o |
| 4-(12-acetoxyoleoyl) morpholine | − | − | − | − | − | − | − | − | − | − | − | o |
| 4-(12-acetoxystearoyl) morpholine | + | − | − | − | + | − | − | − | − | − | − | oo |
| *4-(12-propionoxyoleoyl) morpholine* | + | + | − | − | − | ++ | − | − | − | − | − | oo |
| 1,12-bis(β-cyanoethoxy)-cis-9-octadecene | + | + | + | − | − | − | − | − | − | − | − | o |
| 1,12-bis(β-cyanoethoxy)octadecane | − | − | − | − | − | − | − | − | − | − | − | − |
| 4-oleoylmorpholine | + | − | − | o | + | − | − | − | − | − | ++ | − |
| 4-elaidoylmorpholine | − | − | − | − | − | + | − | o | − | − | − | − |
| 4-stearoylmorpholine | + | + | − | − | − | + | − | o | o | + | o | o |
| Oleic acid | + | − | − | − | − | − | − | o | − | − | − | − |
| Elaidic acid | + | − | − | − | − | − | − | o | − | − | − | oo |
| Stearic acid | + | − | − | − | − | − | − | − | − | − | o | o |
| Petroselinic acid | ++ | + | − | − | + | + | − | o | o | + | ++ | ++ |
| Petroselaidic acid | − | − | − | − | − | − | − | − | − | − | − | − |
| Sorbic acid | ++ | ++ | ++ | + | ++ | ++ | + | ++ | + | + | ++ | ++ |
| 10-undecenoic acid | ++ | ++ | ++ | + | ++ | ++ | + | ++ | + | + | ++ | ++ |
| Vinyl 10-undecenoate | − | − | − | − | − | − | − | o | − | − | − | − |

[a] The new antimicrobial compound is italicized.
[b] ++=Good; +=Fair; −=None; oo=Organism failed to grow over compound; o=Very slight growth over the compound.
[c] A=*Micrococcus pyogenes;* B=*Escherichia coli;* C=*Saccharomyces cerevisiae;* D=*Candida stellatoidea;* E=Torulopsis sp.; F=Neurospora sp.; G=Alternaria sp.; H=Mucor sp.; I = Homodendrum sp.; J = Geotrichum sp.; K = Penicillium sp.; L = Aspergillus sp.

TABLE IIA.—ANTIMICROBIAL ACTIVITY OF SOME FATTY ACID DERIVATIVES

| Compound [a] | Antimicrobial activity [b] — Microorganisms [c] ||||||||||||
| --- | --- | --- | --- | --- | --- | --- | --- | --- | --- | --- | --- | --- |
| | A | B | C | D | E | F | G | H | I | J | K | L |
| 6-hydroxycaproic acid | | | + | ++ | | oo | ++ | | ++ | | + | ++ |
| *4-(6-hydroxycaproyl) morpholine* | | | | o | oo | | ++ | oo | ++ | | ++ | |
| *4-(6-hydroxycaproyl)-2,6-dimethylmorpholine* | | | | | | | ++ | | | | ++ | |
| Lactone of 6-hydroxy-caproic acid | | | oo | ++ | | | ++ | | ++ | | | ++ |
| Ethyl 6-hydroxycaproate | | | + | ++ | ++ | ++ | ++ | ++ | ++ | ++ | | |
| Sodium 6-hydroxycaproate | | | | ++ | | | ++ | | | | | oo |
| 6-aminocaproic acid | | | − | − | | oo | | | oo | | | oo |
| Lactam of 6-aminocaproic acid | | | ++ | oo | | | ++ | | + | | oo | |
| Nonanoic acid | | | ++ | ++ | | | ++ | | ++ | | | |
| *4-nonanoylmorpholine* | | | ++ | ++ | | ++ | ++ | ++ | ++ | ++ | | ++ |
| Decanoic acid | | | ++ | ++ | ++ | | ++ | | ++ | | | ++ |
| *4-decanoylmorpholine* | | | ++ | ++ | | | ++ | | ++ | | | ++ |
| *4-decanoyl-2,6-dimethylmorpholine* | oo | ++ | + | ++ | | ++ | ++ | ++ | ++ | ++ | | ++ |
| *N-butyldecanamide* | | + | − | o | | o | ++ | oo | ++ | ++ | | oo |
| *N-isoamyldecanamide* | | oo | − | o | | oo | ++ | ++ | ++ | ++ | | |
| *N-cyclohexyldecanamide* | | | − | o | | oo | oo | oo | | oo | | ++ |
| *N,N-bis (2-decanoyloxyethyl) decanamide* | | − | o | o | | + | oo | o | o | o | | |
| *N-decanoylpiperidine* | | | | o | | | ++ | ++ | ++ | ++ | | ++ |
| *N-decanoylhexamethylenimine* | | ++ | oo | + | | | ++ | ++ | | | | |
| *N-decanoyl-N'-methylpiperazine* | | | | ++ | | | ++ | | ++ | | | |
| *N,N-didecanoylpiperazine* | o | o | o | − | | | o | | | | | |
| *N-decanoyltetrahydroquinoline* | | | | oo | | oo | + | + | + | oo | | oo |
| Lauric acid | | | ++ | ++ | | | ++ | | + | | ++ | |
| *4-lauroylmorpholine* | | | ++ | ++ | ++ | | ++ | | ++ | | | ++ |
| *N,N-bis (2-hydroxyethyl)-lauramide* | + | ++ | ++ | ++ | | ++ | ++ | | ++ | | | ++ |
| *N,N-bis (2-decanolyloxyethyl) lauramide* | oo | − | oo | o | | oo | oo | oo | o | + | | |
| *N,N-bis (2-lauroyloxyethyl) lauramide* | | | | oo | | | oo | | | | | oo |
| Palmitic acid | | | oo | o | | | oo | | o | | − | |
| *4-Palmitoylmorpholine* | | | − | − | ++ | | + | | − | | | + |
| Stearic acid | o | + | − | − | − | oo | oo | | − | o | | oo |
| *4-stearoylmorpholine* | + | − | | | | | | | | | | |
| 6(7)-hydroxystearic acid | | | | o | | | oo | | oo | | | oo |
| *4-6(7)-hydroxystearoyl) morpholine* | | | | o | | oo | | | o | | | |
| 6,7-epoxystearic acid | | | | − | o | − | oo | oo | oo | − | | |
| 12-hydroxystearic acid | | | − | oo | | | oo | | − | | | oo |
| *4-(12-hydroxystearoyl) morpholine* | | | | + | | | + | | + | | | ++ |
| Methyl 12-hydroxystearate | | | | oo | | | | | o | | −− | oo |
| *4-(epoxystearoyl) morpholine* | | | | | | | | | | | | |
| *N,N-bis(2-acetoxyethyl)epoxystearamide* | | | − | o | | + | ++ | ++ | + | ++ | | |
| *N-N-bis(2-acetoxyethyl)diepoxystearamide* | | | oo | o | | + | ++ | + | + | ++ | | |
| Oleic acid | | | | | | | | | | | | oo |
| *4-oleoylmorpholine* | | | oo | − | | | ++ | | o | | ++ | ++ |
| *4-oleoyl-2,6-dimethylmorpholine* | oo | | − | | | oo | | oo | o | − | | |
| *4-(epoxyoctadecenoyl) morpholine* | | | + | ++ | | | ++ | | ++ | | | ++ |
| Ricinoleic acid | | | gf | | | | | | o | | | ++ |
| *4-ricinoleoylmorpholine* | | | + | ++ | | | | | + | | | ++ |
| Methyl ricinoleate | | | o | − | | + | oo | oo | oo | | | − |
| *4-(12-propionoxyoleoyl) morpholine* | | | | + | oo | oo | oo | ++ | + | oo | | |
| *N-tert-butyloleamide* | | − | | o | | oo | oo | oo | o | o | | |
| *N,N-bis(2-hydroxyethyl)oleamide* | | | oo | − | oo | | + | | − | | | oo |
| *N,N-bis(2-acetoxyethyl)oleamide* | | | | − | | | | | | | | |
| *N,N-bis(2-benzolyoxyethyl)oleamide* | | | oo | ++ | | | ++ | | + | | | ++ |
| *N,N-bis(2-acetoxyethyl)epoxyoctadecenamide* | | | oo | o | | − | ++ | | | + | | |
| *N-oleoylhexamethylenimine* | o | o | − | − | | | o | | | | | |
| *N-oleoyl-N'-methylpiperazine* | | | + | ++ | | + | ++ | ++ | ++ | ++ | | |
| Petroselinic acid | | | gf | ++ | | oo | | | + | | | ++ |
| *4-petroselinoylmorpholine* | | | oo | o | oo | | oo | o | oo | o | o | |
| Methyl petroselinate | | | − | oo | | − | + | oo | + | o | | |
| Elaidic acid | | | | | | | | | | | | |
| *4-elaidoylmorpholine* | | | oo | − | | | + | | o | | | ++ |
| Linoleic acid | | | | + | | + | ++ | | ++ | | | ++ |
| *4-linoleoylmorpholine* | | | oo | + | | | + | | − | | | + |
| Dimerized linoleic acid (Empol 1022) | | | o | − | oo | oo | oo | oo | oo | o | | o |
| Dimerized *4-linoleoylmorpholine* | | | | | | | | | | | | |
| Partially hydrogenated cottonseed acids [d] | | | oo | | | | | | o | − | | |
| Morpholides of partially hydrogenated cottonseed acids [e] | | | oo | | | | ++ | | o | | oo | ++ |
| Morpholides of partially epoxidized cottonseed acids [f] | | | oo | + | | | ++ | | + | | + | ++ |
| *N,N-bis(2-acetoxyethyl)amides of partially epoxidized cottonseed acids* [g] | | | oo | o | + | + | ++ | ++ | + | oo | o | |
| *N,N-bis(2-acetoxyethyl)amides of partially hydrogenated cottonseed acids* [h] | | | | | | | | | | | | |
| Parsley seed acids | | | | − | + | | + | | | | oo | |
| *Morpholides of parsley seed oil fatty acids* | | | oo | − | | oo | oo | | − | | | oo |
| Morpholides of rapeseed acids | | | oo | + | oo | | oo | | | | | oo |
| *N,N-bis(2-acetoxyethyl)amides of rapeseed acids* | | | − | + | | | oo | | | | | oo |
| 10-undecenoic acid | | | | ++ | | | ++ | | ++ | | | ++ |
| *4-(10-undecenoyl)-morpholine* | | | | ++ | | | ++ | | ++ | | ++ | |
| Sorbic acid | | | ++ | ++ | | | ++ | | ++ | | | ++ |
| *4-sorboylmorpholine* | | | ++ | | | ++ | ++ | ++ | ++ | ++ | | |
| Morpholine | | | | ++ | | | ++ | | ++ | | | ++ |
| Piperdine | | | ++ | ++ | | | ++ | | ++ | ++ | | ++ |
| Piperazine hexhydrate | | | − | ++ | | | ++ | | | oo | | |

[a] The new antimicrobial compounds are italicized.
[b] ++ = Good; + = Fair; − = None; oo = Organism failed to grow on disc; o = Slight growth of organism on disc.
[c] A = *Escherichia coli*; B = *Micrococcus pyogenes*; C = *Candida albicans*; D = *Candida wernecki*; E = *Epidermophyton floccosum*; F = *Keratinomyces ajelloi*; G = *Microsporum canis*; H = *Microsporum cookii*; I = *Microsporum gypseum*. J = *Microsporum Nanum*; K = *Trichophyton concentricum*; L = *Trichophyton epilans*.
[d] Iodine value of 66.0; Thiocyanogen value of 65.8.
[e] Iodine value of 58.7; Thiocyanogen value of 53.9.
[f] Oxirane content of 2.78%.
[g] Oxirane content of 2.35%.
[h] Iodine value of 45.3; Thiocyanogen value of 41.5.

TABLE IIB

| Compound [a] | Antimicrobial activity [b] — Micro-organisms [c] | | | | | | | | | | | |
|---|---|---|---|---|---|---|---|---|---|---|---|---|
| | M | N | O | P | Q | R | S | T | U | V | W | X |
| 6-hydroxycaproic acid | oo | | ++ | | ++ | oo | ++ | | | ++ | ++ | |
| *4-(6-hydroxycaproyl)morpholine* | | | ++ | | ++ | | ++ | | | | ++ | |
| *4-(6-hydroxycaproyl)-2,6-dimethylmorpholine* | | | ++ | | | | ++ | | | | + | |
| Lactone of 6-hydroxycaproic acid | | | ++ | | ++ | | ++ | + | | ++ | + | |
| Ethyl 6-hydroxycaproate | ++ | | | | ++ | ++ | ++ | | | | ++ | |
| Sodium 6-hydroxycaproate | | | + | | − | | | | | | | |
| 6-aminocaproic acid | | | oo | | | | ++ | oo | | − | oo | + |
| Lactam of 6-aminocaproic acid | | | oo | | oo | | oo | | | | oo | |
| Nonanoic acid | | | | | ++ | ++ | | | | | | |
| *4-nonanoylmorpholine* | ++ | | | | ++ | ++ | | | | | | |
| Decanoic acid | | | ++ | | ++ | | ++ | ++ | | ++ | ++ | ++ |
| *4-decanoylmorpholine* | | | | | | | | | | | | |
| *4-decanoyl-2,6-dimethylmorpholine* | ++ | | | | ++ | ++ | | | | | ++ | |
| N-butyldecanamide | oo | | | | oo | oo | | | | | oo | |
| N-isoamyldecanamide | oo | | | | ++ | ++ | | | | | ++ | |
| N-cyclohexyldecanamide | oo | | | | − | − | | | | | | |
| N,N-bis(2-decanoyloxyethyl)decanamide | oo | | | | | o | | | | | oo | |
| N-decanoylpiperidine | oo | | | | ++ | | ++ | | | | ++ | |
| N-decanoylhexamethylenimine | ++ | ++ | | | ++ | ++ | | | | | | |
| *N-decanoyl-N'-methylpiperazine* | | | | ++ | ++ | | ++ | | | | | |
| *N,N-didecanoylpiperazine* | − | | | | | | | | | − | | |
| *N-decanoyltetrahydroquinoline* | + | | | | + | + | | | | | oo | |
| Lauric acid | | | ++ | | ++ | | ++ | | | | ++ | |
| *4-lauroylmorpholine* | | | ++ | | ++ | | ++ | ++ | ++ | ++ | ++ | ++ |
| N,N-bis(2-hydroxyethyl)lauramide | ++ | ++ | | ++ | ++ | | ++ | | | ++ | ++ | |
| N,N-bis(2-decanoyloxyethyl)lauramide | oo | | | | − | − | oo | | | | | oo |
| N,N-bis(2-lauroyloxyethyl)lauramide | | | − | | oo | | oo | | | | | |
| Palmitic acid | ++ | | | | oo | ++ | | | | | | |
| *4-palmitoylmorpholine* | | | oo | | oo | | oo | oo | | ++ | oo | ++ |
| Stearic acid | oo | oo | | | − | − | | | | oo | o | |
| *4-stearoylmorpholine* | | | | | | | | | | | | |
| 6(7)-hydroxystearic acid | | | oo | | − | | oo | | | | − | |
| *4-6(7)-hydroxystearoyl)morpholine* | | | | ++ | ++ | | ++ | | | | | |
| 6,7-epoxystearic acid | oo | | | | + | oo | o | | | | + | |
| 12-hydroxystearic acid | | | oo | | + | | | | | | | |
| *4-(12-hydroxystearoyl)morpholine* | | | ++ | | | | oo | | | ++ | − | |
| Methyl 12-hydroxystearate | | | oo | | − | | oo | | | | − | |
| *4-(epoxystearoyl)morpholine* | | | | | | | | | | | | |
| N,N-bis(2-acetoxyethyl)epoxystearamide | + | | | | ++ | ++ | | | | + | + | + |
| N,N-bis(2-acetoxyethyl)diepoxystearamide | + | oo | | | ++ | ++ | | | | oo | + | |
| Oleic acid | | | | | | | | | | | | |
| *4-oleoylmorpholine* | | | | | oo | | oo | | | | oo | |
| *4-oleoyl-2,6-dimethylmorpholine* | + | | | | − | − | | | | | | oo |
| *4-(epoxyoctadecenoyl)morpholine* | | | ++ | | ++ | | ++ | ++ | | ++ | ++ | |
| Ricinoleic acid | | | ++ | | + | | ++ | | | + | ++ | |
| *4-ricinoleoylmorpholine* | | | ++ | | ++ | | ++ | | | ++ | ++ | |
| Methyl ricinoleate | oo | | | | + | + | − | | | | oo | |
| *4-(12-propionoxyoleoyl)morpholine* | oo | | | oo | + | oo | oo | | | | ++ | |
| *N-tert-butyloleamide* | ++ | | | | | | oo | | | | | oo |
| N,N-bis(2-hydroxyethyl)oleamide | | | ++ | | oo | | oo | ++ | | | + | + |
| N,N-bis(2-acetoxyethyl)oleamide | | | ++ | | ++ | | | | | | | |
| N,N-bis(2-benzoyloxyethyl)oleamide | | | | | ++ | ++ | | | | | | |
| N,N-bis(2-acetoxyethyl)epoxyoctadecenamide | ++ | | | | ++ | | ++ | ++ | | ++ | ++ | |
| *N-oleoylhexamethylenimine* | oo | o | | | o | − | | | | | | |
| *N-oleoyl-N'-methylpiperazine* | ++ | | | | ++ | | + | | | | ++ | |
| Petroselinic acid | oo | | ++ | | + | oo | oo | | | ++ | + | |
| *4-petroselinoylmorpholine* | | | | | oo | | | | ++ | | oo | |
| Methyl petroselinate | oo | | oo | | oo | | o | | | | − | |
| Elaidic acid | | | | | | | | | | | | |
| *4-elaidoylmorpholine* | | | | | + | | oo | | | ++ | + | |
| Linoleic acid | ++ | | | ++ | ++ | | ++ | | | ++ | | |
| *4-linoleoylmorpholine* | | | + | | oo | | oo | | oo | + | oo | |
| Dimerized linoleic acid (Empol 1022) | oo | | | | oo | oo | | | | | oo | o |
| *Dimerized 4-linoleoylmorpholine* | | | | | | | | | | | | |
| Partially hydrogenated cottonseed acids [d] | oo | | | | | oo | | | | | | |
| Morpholides of partially hydrogenated cottonseed acids [e] | | | | | oo | | oo | | | ++ | o | |
| Morpholides of partially epoxidized cottonseed acids [f] | | | | | ++ | | ++ | | | ++ | ++ | |
| N,N-bis(2-acetoxyethyl)amides of partially epoxidized cottonseed acids [g] | + | oo | | | ++ | ++ | | | | + | + | |
| N,N-bis(2-acetoxyethyl)amides of partially hydrogenated cottonseed acids [h] | | | | | | | | | | | | |
| Parsley seed acids | | | oo | | + | | ++ | oo | | ++ | + | ++ |
| *Morpholides of parsley seed oil fatty acids* | | | oo | | oo | | oo | o | | o | oo | o |
| Morpholides of rapeseed acids | | | oo | | o | | oo | oo | | oo | oo | − |
| N,N-bis(2-acetoxyethyl)amides of rapeseed acids | | | ++ | | ++ | | ++ | | | | ++ | |
| 10-undecenoic acid | | | ++ | | ++ | | ++ | | | | ++ | |
| *4-(10-undecenoyl)morpholine* | | | ++ | | ++ | | ++ | | | ++ | ++ | |
| Sorbic acid | | | | | | | | | | | | |
| *4-sorboylmorpholine* | ++ | | | | ++ | ++ | | | | | ++ | |
| Morpholine | | | ++ | | ++ | ++ | ++ | | | | ++ | |
| Piperidine | ++ | | | | ++ | ++ | | | | | ++ | |
| Piperazine hydrate | + | | | | + | | | | | | ++ | |

[a] The new antimicrobial compounds are italicized.
[b] ++ = good; + = fair; − = none; oo = Organism failed to grow on disc.
o = slight growth of organism on disc.
[c] M = *Trichophyton equinum*; N = *Tricophyton ferrugineum*; O = *Trichophyton gallinae*; P = *Trichophyton megnini*; Q = *Trichophyton mentagrophytes* var. *interdigitales*; R = *Trichophyton mentagrophytes* var. *granulare*; S = *Trichophyton rubrum*; T = *Trichophyton sabouraudi*; U = *Trichophyton schoenleini*; V = *Trichophyton sulfurium*; W = *Trichophyton tonsurans*; X = *Trichophyton violaceum*.
[d] Iodine value of 66.0; Thiocyanogen value of 65.8.
[e] Iodine value of 58.7; Thiocyanogen value of 53.9.
[f] Oxirane content of 2.78%.
[g] Oxirane content of 2.35%.
[h] Iodine value of 45.3; Thiocyanogen value of 41.5.

Example 1

*4-(6-hydroxycaproyl)morpholine.*—Eighty grams (0.7 mole) of the epsilon-lactone of 6-hydroxycaproic acid and 122 grams (1.4 moles) of morpholine were stirred and refluxed for 19 hours. Titration of one-milliliter aliquots periodically for unreacted morpholine indicated that 92% of the lactone had reacted with the morpholine. After the excess morpholine had been stripped under reduced pressure, the product was distilled under high vacuum. The fraction distilling between 149–151° C. at 2 microns was crystallized from ethyl acetate. Nitrogen content of the product, 4-(6-hydroxycaproyl)morpholine, was 6.88% (theory 6.96%).

Example 2

*4-decanoyl-2,6 - dimethylmorpholine.*—Eight and sixtenths grams (0.075 mole) of 2,6 - dimethylmorpholine were dissolved in 20 milliliters of benzene. Then 7.08 grams (0.037 mole) of decanoyl chloride were added dropwise with stirring. After stirring for an additional hour, the reaction mixture was filtered, washed successively with dilute hydrochloric acid and water, and dried over anhydrous sodium sulfate. Free acid was removed by percolating the benzene solution through a column of activated alumina and eluting the morpholide with a 1:1 ethanol-benzol mixture. The solvent was then removed by stripping under reduced pressure. Nitrogen content of the product, 4-decanoyl-2,6-dimethylmorpholine, was 5.04% (theory 5.21%).

Example 3

*N-butyldecanamide.*—N-butyldecanamide was prepared by the procedure of Example 2 from 6.44 grams (0.088 mole) of n-butylamine and 8.39 grams (0.044 mole) of decanoyl chloride. Nitrogen content of the product, N-butyldecanamide, after recrystallization three times in 95% methanol, was 6.09% (theory 6.16%).

Example 4

*N-isoamyldecanamide.*—N-isoamyldecanamide was prepared by the procedure of Example 2 from 7.22 grams (0.083 mole) of isoamylamine and 7.90 grams (0.041 mole) of decanoyl chloride. The product, N - isoamyldecanamide, had a nitrogen content of 5.39% (theory 5.80%).

Example 5

*N - cyclohexyldecanamide.*—N - cyclohexyldecanamide was prepared by the procedure of Example 2 from 7.82 grams (0.079 mole) of cyclohexylamine and 7.53 grams (0.039 mole) of decanoyl chloride. The product, N-cyclohexyldecanamide, had a nitrogen content of 5.39% (theory 5.53%).

Example 6

*N,N-bis(2 - decanoyloxyethyl)decanamide.*—A mixture of 5.0 grams (0.048 mole) of diethanolamine, 25.8 grams (0.150 mole) of decanoic acid, and 20 milliliters of benzene was refluxed in an apparatus equipped with a Dean-Stark trap until the evolution of water ceased. The reaction mixture was diluted with 200 milliliters of commercial hexane, washed successively with dilute hydrochloric acid and water, and dried over anhydrous sodium sulfate. Free acid was removed by percolating the hexane solution through a column of activated alumina, and eluting the amide with a 1:1 hexane-ethanol mixture. The solvent was removed by stripping under reduced pressure. The product, N,N-bis(2 - decanoyloxyethyl)decanamide, had a nitrogen content of 2.62% (theory 2.47%).

Example 7

*N - decanoylhexamethylenimine.*—N - decanoylhexamethylenimine was prepared by the procedure of Example 2 from 5.2 grams (0.053 mole) of hexamethylenimine, 10.0 grams (0.053 mole) of decanoyl chloride, and 4.2 grams (0.053 mole) of pyridine. The product, N-decanoylhexamethylenimine, had a nitrogen content of 5.31% (theory 5.53%).

Example 8

*N-decanoyl-N'-methylpiperazine.*—N - decanoyl - N'-methylpiperazine was prepared by the procedure of Example 2 from 5.24 grams (0.052 mole) of N-methylpiperazine, 4.2 grams (0.053 mole) of pyridine, and 10.0 grams (0.053 mole) of decanoyl chloride. The product, N-decanoyl-N'-methylpiperazine, had a nitrogen content of 10.83% (theory 11.01%).

Example 9

*N,N'-didecanoylpiperazine.*—A mixture of 13.8 grams (0.16 mole) of piperazine, 60.2 grams (0.35 mole) of decanoic acid, and 20 milliliters of benzene was refluxed in an apparatus equipped with a Dean-Stark trap for 12 hours. The reaction mixture was diluted with 100 milliliters of commercial hexane, washed successively with dilute hydrochloric acid and water, and dried over anhydrous sodium sulfate. After stripping the solvent, the reaction products were dissolved in carbon tetrachloride. The unreacted decanoic acid was converted to its potassium salt with 4% alcoholic potassium hydroxide. Then the mixture was extracted twice with water to remove the potassium decanoate. The carbon tetrachloride solution was dried over anhydrous sodium sulfate. After stripping the solvent, the amide was crystallized from ethanol. The product, N,N'-didecanoylpiperazine, had a nitrogen content of 7.07% (theory 7.09%).

Example 10

*N-decanoyltetrahydroquinoline.*—N - decanoyltetrahydroquinoline was prepared by the procedure of Example 2 from 7.0 grams (0.053 mole) of tetrahydroquinoline, 4.2 grams (0.053 mole) of pyridine, and 10.0 grams (0.053 mole) of decanoyl chloride. The product, N-decanoyltetrahydroquinoline, had a nitrogen content of 4.79% (theory 4.87%).

Example 11

*N,N-bis(2-hydroxyethyl)lauramide.*—Fifty-eight grams (0.27 mole) of methyl laurate was added dropwise to a stirred mixture of 28.4 grams (0.27 mole) of diethanolamine and 1.0 gram (0.043 mole) of sodium (dissolved in a small amount of methanol) under reduced pressure (60 millimeters) at 65° C. Stirring and heating was continued for an additional hour, until the evolution of methanol was complete. After the catalyst was neutralized by adding 3.5 grams (0.046 mole) of glycolic acid, the reaction mixture was dissolved in commercial hexane and filtered. After washing with water, the solvent was removed under reduced pressure. The product, N,N-bis(2-hydroxyethyl)lauramide, had a nitrogen content of 4.87% (theory 4.87%).

Example 12

*N,N-bis(2 - decanoyloxyethyl)lauramide.*—Seven grams (0.037 mole) of decanoyl chloride was added dropwise to a stirred mixture of 5.0 grams (0.017 mole) of N,N-bis(2-hydroxyethyl)lauramide, 3.0 grams (0.038 mole) of pyridine, and 20 milliliters of dioxane. Stirring was continued for an additional 40 minutes. After hydrolyzing the excess decanoyl chloride with water, 100 milliliters of hexane was added. The pyridine hydrochloride and dioxane were removed by repeated water washings. The hexane solution was dried over anhydrous sodium sulfate, filtered, passed through an activated alumina column to remove residual free acid, and disolventized under reduced pressure. The product, N,N-bis(2-decanoyloxyethyl)lauramide had a nitrogen content of 2.41% (theory 2.34%).

Example 13

*N,N - bis(2 - lauroyloxyethyl)lauramide.*—N,N-bis(2-lauroyloxyethyl)lauramide was prepared by the procedure of Example 6 from 5.0 grams (0.048 mole) of diethanolamine and 30.0 grams (0.150 mole) of lauric acid. The product, N,N - bis(2-lauroyloxyethyl)lauramide, had a nitrogen content of 2.22% (theory 2.15%).

Example 14

*4 - (6(7) - hydroxystearoyl)morpholine.* — Six grams (0.02 mole) of 6(7)-hydroxy-stearic acid, 10.5 grams (0.12 mole) of morpholine, and 10 milliliters of benzene were stirred under reflux in an apparatus equipped with a Dean-Stark trap. Periodic infrared analysis indicated that the reaction had approached equilibrium after 60 hours. The reaction mixture was diluted with 50 milliliters of diethyl ether and washed three times with 40-milliliter portions of 1% sodium hydroxide solution (4:1 mixture of water and isopropanol). Then the ether-benzene solution was washed three times with 50-milliliter portions of water. After drying the ether-benzene solution over anhydrous calcium sulfate, the solvent was stripped. The product, 4-(6(7)-hydroxystearoyl)morpholine, was recrystallized from petroleum ether. Elementary analysis indicated 3.75% nitrogen (theory 3.79%).

Example 15

*4 - oleoyl - 2,6 - dimethylmorpholine.*—4-oleoyl-2,6-dimethylmorpholine was prepared by the procedure of Example 6 from 40.8 grams (0.36 mole) of 2,6-dimethylmorpholine and 50.0 grams (0.18 mole) of oleic acid. The product, 4-oleoyl-2,6-dimethylmorpholine, had a nitrogen content of 3.70% (theory 3.69%).

Example 16

*4-(12-propionoxyoleoyl)morpholine.* — Three hundred twelve grams (1 mole) of methyl ricinoleate and 174 grams (2 moles) of morpholine were stirred and refluxed in an apparatus equipped with a short Vigreaux column, reflux condenser, and Dean-Stark trap. Titration of one-milliliter aliquots periodically for unreacted morpholine indicated that the reaction had approached equilibrium after 36 hours. After the excess morpholine had been stripped under reduced pressure, the product was distilled under high vacuum. 4-ricinoleoylmorpholine distilled between 243–246° C. at 0.2 millimeter. Elementary analysis indicated 3.80% nitrogen (theory 3.81%). One hundred fifty grams (0.41 mole) of 4-ricinoleoyl-morpholine and 150 grams (1.15 mole) of propionic anhydride were stirred and refluxed for three hours. After the propionic acid and excess propionic anhydride were distilled under reduced pressure, the product was distilled under high vacuum. The fraction distilling between 250–254° C. at 0.3 millimeter was dissolved in benzene and percolated through a column of activated alumina. The morpholide was eluted with a 1:1 ethanol-benzene mixture. After stripping the solvent under reduced pressure, the product, 4-(12-propionoxyoleoyl)morpholine, had a nitrogen content of 3.12% (theory 3.31%).

Example 17

*N-tert-butyloleamide.*—N-tert-butyloleamide was prepared by the procedure of Example 2 from 19.6 grams (0.27 mole) of tert-butylamine and 40.0 grams (0.13 mole) of oleoyl chloride. The product, N-tert-butyloleamide, had a nitrogen content of 4.19% (theory 4.12%).

Example 18

*N-oleoylhexamethylenimine.* — N-oleoylhexamethylenimine was prepared by the procedure of Example 2 from 9.88 grams (0.10 mole) of hexamethylenimine, 8.0 grams (0.10 mole) of pyridine, and 30.0 grams (0.10 mole) of oleoyl chloride. The product, n-oleoylhexamethylenimine, had a nitrogen content of 3.79% (theory 3.85%).

Example 19

*N - oleoyl-N'-methylpiperazine.* — N-oleoyl-N'-methylpiperazine was prepared by the procedure of Example 2 from 23.3 grams (0.23 mole) of N-methylpiperazine and 35.0 grams (0.12 mole) of oleoyl chloride. The product, N-oleoyl-N'-methylpiperazine, had a nitrogen content of 7.44% (theory 7.68%).

Example 20

*4-petroselinoylmorpholine.*—4-petroselinoylmorpholine was prepared by the procedure of Example 6 from 6.2 grams (0.071 mole) of morpholine and 10.0 grams (0.035 mole) of petroselinic acid. The product, 4-petroselinoylmorpholine, had a nitrogen content of 3.94% (theory 3.98%).

Example 21

*Morpholides of parsley seed oil fatty acids.*—The essential oil was removed from the crude hexane-extracted parsley seed oil by steam distillation. The parsley seed oil was saponified with potassium hydroxide, and the soaps were decomposed with hydrochloric acid to obtain the free parsley seed oil fatty acids.

The morpholides of parsley seed acids were prepared by the procedure of Example 6 from 32 grams of morpholine and 68 grams of parsley seed acids. The product, the morpholides of parsley seed oil fatty acids, had a nitrogen content of 3.43%.

We claim:

1. A process of controlling microbial activity comprising contacting the microbe with an antimicrobial composition containing as its active ingredient a member selected from the group consisting of N-n-butyldecanamide, N-isoamyldecanamide, N-cyclohexyldecanamide, N,N-bis (2 - decanoyloxyethyl)decanamide, N,N - bis(2-decanoyl oxyethyl)lauramide, and N-tert-butyloleamide.

2. The process of claim 1 wherein the member is N-n-butyldecanamide.

3. The process of claim 1 wherein the member is N-isoamyldecanamide.

4. The process of claim 1 wherein the member is N-cyclohexyldecanamide.

5. The process of claim 1 wherein the member is N,N-bis(2-decanoyloxyethyl)decanamide.

6. The process of claim 1 wherein the member is N,N-bis(2-decanoyloxyethyl)lauramide.

7. The process of claim 1 wherein the member is N-tert-butyloleamide.

References Cited by the Examiner

Dictionary of Organic Chemistry IV (1953), Oxford University Press, New York, page 78.

JULIAN S. LEVITT, *Primary Examiner.*

STANLEY J. FRIEDMAN, *Assistant Examiner.*